United States Patent [19]

Wu et al.

[11] Patent Number: 5,670,603
[45] Date of Patent: Sep. 23, 1997

[54] POLYMERS EXHIBITING NONLINEAR OPTICAL PROPERTIES

[75] Inventors: Chengjiu Wu, Morristown; Jianhui Shan, Highbridge; Ajay Nahata, Chatham, all of N.J.

[73] Assignee: AlliedSignal Inc., Morris Township, N.J.

[21] Appl. No.: 28,921

[22] Filed: Mar. 8, 1993

[51] Int. Cl.⁶ .................... C08G 63/13; C08G 63/133; C08G 18/28; C08G 18/70; C08G 59/00; C08G 69/26; C08G 64/04
[52] U.S. Cl. .................. 528/190; 252/582; 528/73; 528/74; 528/86; 528/97; 528/125; 528/171; 528/172; 528/174; 528/176; 528/191; 528/192; 528/196; 528/201; 528/202; 528/208; 528/210; 528/211; 528/219; 528/220; 528/272; 528/291; 528/292; 528/293; 528/294; 528/295; 528/298; 528/299; 528/300; 528/306; 528/307; 528/308; 528/332; 528/344; 528/350; 528/353; 528/360; 528/370; 528/372; 528/374; 528/377; 528/391; 528/401; 528/402; 528/403; 528/405; 528/406; 528/422; 528/425; 528/205; 528/206; 528/373
[58] Field of Search .................. 528/171, 172, 528/173, 174, 176, 190, 191, 192, 205, 206, 208, 210, 219, 291, 272, 292, 294, 295, 298, 299, 300, 306, 307, 308, 74, 97, 196, 201, 202, 211, 293, 332, 344, 350, 360, 353, 370, 372, 374, 377, 391, 401, 402, 403, 405, 406, 422, 425, 86, 73, 125, 220, 373; 252/582

[56] References Cited

U.S. PATENT DOCUMENTS

| | | | |
|---|---|---|---|
| 3,546,165 | 12/1970 | Morgan | 528/190 |
| 4,006,017 | 2/1977 | Williams et al. | 430/79 |
| 4,226,967 | 10/1980 | Tazuke et al. | 528/73 |
| 4,387,209 | 6/1983 | Reider et al. | 528/176 |
| 4,430,493 | 2/1984 | Reider | 528/176 |
| 4,612,350 | 9/1986 | Parker | 528/126 |
| 4,684,678 | 8/1987 | Schultz et al. | 528/27 |
| 4,719,281 | 1/1988 | Choe | 528/291 |
| 4,757,130 | 7/1988 | DeMartino | 528/292 |
| 4,773,743 | 9/1988 | Choe et al. | 359/321 |
| 4,806,618 | 2/1989 | Imai et al. | 528/190 |
| 4,810,771 | 3/1989 | Teramoto et al. | 528/298 |
| 4,826,950 | 5/1989 | DeMartino | 528/292 |
| 4,851,502 | 7/1989 | DeMartino | 528/291 |
| 4,867,540 | 9/1989 | DeMartino | 528/292 |
| 4,904,755 | 2/1990 | Machell et al. | 528/193 |
| 4,925,913 | 5/1990 | Teramoto et al. | 528/298 |
| 4,967,306 | 10/1990 | Hampl, Jr. et al. | 528/176 |
| 4,968,331 | 11/1990 | Sakashita et al. | 528/298 |
| 5,007,945 | 4/1991 | Tien et al. | 528/190 |
| 5,009,679 | 4/1991 | Angus et al. | 528/329.1 |
| 5,037,935 | 8/1991 | Gulotty et al. | 528/151 |
| 5,061,404 | 10/1991 | Wu et al. | 252/582 |
| 5,093,456 | 3/1992 | Mitra et al. | 528/291 |
| 5,106,936 | 4/1992 | Gulotty et al. | 528/128 |
| 5,176,854 | 1/1993 | Ito et al. | 252/582 |
| 5,189,134 | 2/1993 | Mignani et al. | 528/292 |
| 5,207,952 | 5/1993 | Griffin, III | 528/292 |
| 5,208,299 | 5/1993 | Bales et al. | 528/176 |
| 5,212,015 | 5/1993 | Mitra et al. | 528/298 |
| 5,354,511 | 10/1994 | Wu et al. | 252/582 |
| 5,502,135 | 3/1996 | Beckmann et al. | 526/262 |

FOREIGN PATENT DOCUMENTS

| | | |
|---|---|---|
| 0 325 058 | 7/1989 | European Pat. Off. . |
| 4 3456 08 | 12/1992 | Japan . |
| 5 196 977 | 8/1993 | Japan . |
| WO91/09081 | 6/1991 | WIPO . |

OTHER PUBLICATIONS

Prasad, Paras N., "Introduction to Nonlinear Optical Effects in Molecules and Polymers", *A Wiley–Interscience Publication*, (1991), pp. 133–174.
Man, H–T, "The Stability of Poled Nonlinear Optical Polymers" *Adv. Mater.*, vol. 4, (1992), No. 3, pp. 159–168.
Korshak, V.V., "Cardo Polymers", *J. Macromol. Sci.–Rev. Macromol. Chem.*C11(1), (1974), pp. 45–142.
Morgan, P.W., "Aromatic Polyesters with Large Cross–Planar Substituents", *Mocromolecules*, (1965), p. 536.
Korshak, V.V., "Thermally Stable Soluble Polyimides", *Aca. Sci. USSR Bull. Div. Chem Sci.*, (1967), pp. 2172–2178.
Korshak, V.V., "Comprehensive Polymer Science", *Vysokomol. Soedin. Ser. B, 24*, vol. 5, Chapt 10, (1982), pp. 147–152.
Natahat, A. et al., "Electrooptic Characterization of Organic Media", *IEEE Transactions on Instrumentation and Measurements*, vol. 41, No. 1 (1992), pp. 128–131.

Primary Examiner—Rabon Sergent
Attorney, Agent, or Firm—Melanie Brown; Colleen Szuch

[57] ABSTRACT

This invention relates to polymers having non-linear optical properties which polymers include fluorene moieties having at least one electron accepting group and at least one electon donating group substituted to different phenyl rings of the fluorene moiety.

22 Claims, No Drawings

POLYMERS EXHIBITING NONLINEAR OPTICAL PROPERTIES

BACKGROUND OF INVENTION

1. Field of the Invention

This invention relates to polymers having non-linear optical properties. More particularly, this invention relates to such polymers which include fluorene moieties having at least one electron-accepting group and at least one electron-donating group substituted to different phenyl rings of the fluorene moieties.

2. Prior Art

Polymers having non-linear optical properties are known. Such prior art polymers are basically acrylate or styrene type side c polymers having glass transition temperatures less than 150° C. See P. N. Prasad and D. J. Williams, "Introduction to Non-Linear Optical Effects in Molecular and Polymers", J. Wiley, 1991, Chapter 7; and H-T. Man and H. W. Yoon, *Adv. Mater.*, 4 (1992), 159.

Polymers formed from fluorene derivatives are known. See for example, V. V. Karshak, S. U. Vinogradova and Y. S. Vygodskii, *J. Macromol. Sci. Rev. Macromol. Chem.*, C11 (1974), 45; U.S. Pat. Nos. 3,546,165 and 4,684,678; PCT Appl. WO 91-09,081; P. W. Morgan, *Macromolecules*, 4 (1971), 536; V. V. Korshak, S. V. Vinogradoun, Y. S. Vygodskii, S. A. Pavioda and L. V. Buiko, *Acad.Sci USSR Bull.*, Div. Chem. Sci. (1967) 2172, which are hereby incorporated for reference.

SUMMARY OF THE INVENTION

One aspect of this invention relates to polymers comprising recurring units of the formula:

Formula I

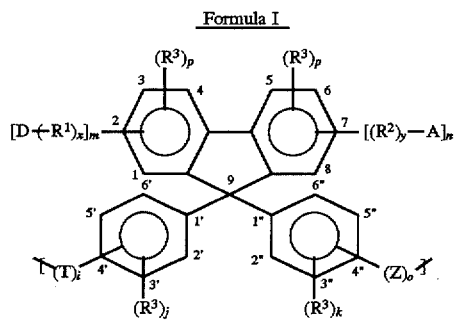

wherein:

A is an electron withdrawing substituent;

D is an electron donating substituent;

$R^1$ and $R^2$ are the same or different and are divalent conjugated organic or inorganic moiety;

m, n and p are the same or different at each occurrence and are integers from 1 to 3 wherein the sum of p and n, as well as the sum of p and m, is equal to 4;

k and o are the same or different at each occurrence and are integers from 1 to 4 wherein the sum of k and o is equal to 5;

$R^3$ is the same or different at each occurrence and is any substituent which does not adversely affect the non-linear optical properties of the polymer unduly;

i and j are the same or different and are 0 or an integer from 1 to 5;

x and y are the same, or different and are 0 or an integer from 1 to about 10;

Z is the same or different at each occurrence and is a moiety of the formula:

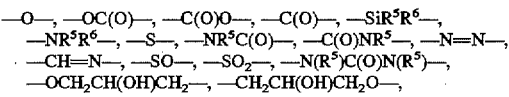

Q and T are the same or different and are selected from the group consisting of divalent moieties of the formula:

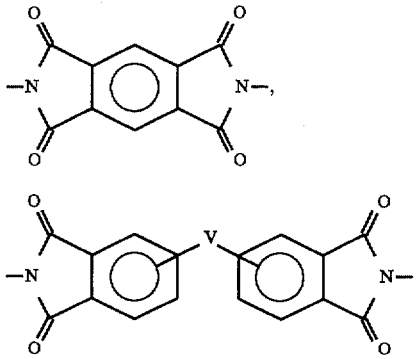

wherein V is —O—, —OC(O)—, —(O)CO—, —C(O)—, —$CR^5R^6$—, —$SiR^5R^6$—, —$NR^5$—, —S—, —$NR^5C(O)$—, —SO— or —$SO_2$—;

$R^4$ is a divalent hydrocarbon radical;

$R^5$ and $R^6$ are monovalent moieties, they are the same or different at each occurrence and are any substituent which does not adversely affect the non-linear optical properties of the polymer unduly.

The polymers of this invention exhibit several useful properties. For example, the polymers of this invention exhibit non-linear optical properties, especially second order non-linear properties.

For purposes of this invention, the term "non-linear optical" (NLO) collectively refers to materials characterized by non-linear response of polarization (dipole moment per volume) to applied electric or electromagnetic (optical) fields. Generally, NLO materials are classified according to the "order" of the nonlinear response. Thus, second order NLO materials respond to the square of the applied fields. Examples of second order NLO phenomena include: second harmonic generation (generation of light at twice the incident frequency); optical rectification (generation of an electric field in response to applied optical radiation); and electro-optic effect (designated EO, change in optical refractive index in response to applied electric field). Third order NLO materials respond to the cube of an applied electric or electromagnetic field. Exemplary third order NLO phenomena include: third harmonic generation (generation of light at three times the incident frequency) and sum and difference frequency generation (generation of a new optical frequency in the presence of two applied optical frequencies).

The polymers of this invention contain at least one electron donating group (designated D), and at least one electron accepting group (designated A), which are separated by the fluorenyl moiety and connected through π-chain links.

The NLO activity of the polymers of this invention is determined by the relative electron accepting and electron donating strength of the A and D groups, respectively, and the length of the π-chain, formed by the —$R^1$— and —$R^2$— groups together with the fluorenyl group. In general, the greater the electron accepting strength of the A group and the greater the electron donating strength of the D group and the longer the π-chain, the greater the NLO activity, other things being equal. To render the polymers of this invention active for second order NLO processes, they must be noncentrosymmetrically aligned ("poled"). This can be achieved by electric field poling, e.g. by subjecting the polymer film to an applied electric field at a temperature close to or above the glass transition temperature (Tg) of the polymer, followed by cooling to temperatures below the Tg in the presence of the applied field. The relatively high glass transition temperature (Tg) of the polymer prevents thermal relaxation (deorientation) of "poled" films at working temperatures.

Besides high NLO activity, other useful chemical and physical properties are exhibited by the polymer of this invention. They have favorable solubility in spin solvents, and sufficient molecular weight so that they can be applied in thin films by the spin coating procedure; and they are transparent in the desired optical frequency range.

Another embodiment of this invention relates to a non-linear optical medium comprising a substrate of a polymer of this invention. Yet another aspect of this invention relates to an optical device having a nonlinear optical component comprising the polymer of this invention.

DESCRIPTION OF THE PREFERRED EMBODIMENTS.

One aspect of this invention relates to polymers of the Formula I in which A, D, $R^1$ $R^2$, $R^3$, $R^4$, $R^5$, k, m, n, i, j, o, p, x, y, Q, T and V are as described above.

A groups can be any electron withdrawing group. Useful A groups include —$NO_2 CO_2 R^5$, —$SO_2 R^5$, —CN, —C(O)$OR^5$, —C(O)$R^5$—, C(CN)=C(CN)$_2$, —CH=C(CN)$_2$, perfluoroalkyl and the like.

D groups can be any electron donating group. Useful D groups include such as —$NR^5 R^6$, —$OR^5$, —$SR^5$,

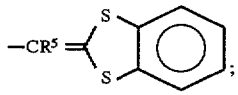

and the like where $R^5$ and $R^6$ are the same or different and are described as before.

Useful $R^1$ and $R^2$ groups include conjugated divalent inorganic or organic radicals. Illustrative of such radicals are conjugated inorganic, aromatic, ethylenically and acetylenically unsaturated aliphatic, heteroaromatic, aromatic vinylene or heteroaromatic vinylene radicals as for example phenylene, dimethylenephenylene, azo, phenoxyphenylene, 2,2-diphenylene propane, benzofurylene, benzylidyne, benzylidene, benzoylene, diazo, phenylenediazo, propenylene, vinylene, phenylenevinylene, furylene, pyrylene, pyrimidylene, quinolylene, pyranylene, pyranylenevinylene, thienylene, thienylenevinylene, pyridinylene, biphenylene, naphthylene, thienylene vinylene, phenylene vinylene, —(CR$^7$=CR$^7$)$_a$—or —(—C≡C—)$_b$—, wherein a and b are the same or different and are integers from 1 to about 10 and $R^7$ is the same or different at each occurrence and is hydrogen, aryl or alkyl such as —CH=CH—, —CH(CH$_3$)=CH—, —CH=CH—CH=CH— and —C≡C—.

Useful $R^1$ and $R^2$ groups may also be substituted with one or more substituents which either enhance the non-linear optical properties of the polymer such as the A and D groups described above or which do not adversely affect the properties to an undue extent. Such substituents include halogen, deuterium, and substituted or unsubstituted alkyl, alkoxy, alkoxyalkyl or aryl, wherein permissible substituents are one or more fluorines.

Useful $R^3$, $R^5$, $R^6$ and $R^7$ groups include hydrogen, deuterium, halogen, alkyl such as methyl, ethyl, butyl, pentyl, octyl, nonyl, tert-butyl, neopentyl, isopropyl, sec-butyl, dodecyl and the like; alkoxy such as propoxy, butoxy, methoxy, isopropoxy, pentoxy, nonoxy, ethoxy, octyloxy and the like; cycloalkyl such as cyclohexyl, cyclooctyl, cycloheptyl, cyclopentyl and the like; alkoxyalkyl and phenoxyalkyl such phenoxymethylene, phenoxyethylene, methoxymethylene, ethoxymethylene, methoxymethylene, butoxymethylene, propoxyethylene, and the like; phenylalkyl such as phenethyl, phenylpropyl, benzyl and the like; and substituted alkyl and phenyl groups such cyanomethyl; 3-chloropropyl, 3,-4-dichlorophenyl, 3,4-dichloro-3-cyanophenyl, fluoroalkyl and perfluoroalkyl such as fluoromethyl, perfluoromethyl, difluoromethyl, 4-nitrophenyl, phenoxyphenyl, 4-methylphenyl, perfluoroethyl, 2,4-dimethylphenyl, 2-nitroethyl, nitromethyl, and the like.

Useful $R^4$ groups include any hydrocarbon which may link the T and Q groups either unsubstituted or substituted with one or more substituents which do not adversely affect the non-linear optical properties of the polymer unduly such as fluorine, alkyl, alkoxy and the like. Illustrative of such $R^4$ groups are alkylene such as methylene, pentylene and the like; arylene such as phenylene, dimethylene phenylene, biphenylene, 2,2-diphenylene propane, naphthalene and moieties of the formula:

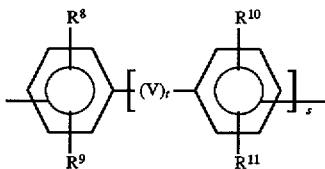

s is 0 or an integer equal to or greater than 1;

t is 0 or 1;

V is the same or different at each occurrence and is as described above;

$R^8$, $R^9$, $R^{10}$ and $R^{11}$ are the same or different at each occurrence and are hydrogen, alkyl, aryl, alkoxyaryl, alkylaryl, arylalkyl, alkyl, aryl, alkoxyaryl, alkylaryl, arylalkyl, alkoxy, alkoxyalkyl, nitro, cycloalkenyl, halo, cyano, cycloalkyl, aryloxy and the like.

Useful Q and T groups include those groups described above.

The general structures of representative polyesters, polycarbonates, polyamides, polyethers, polyureas, polyurethanes, polyimides, and epoxy resins of this invention are shown in the following Formulas II to IX where in A, D, $R^1$, $R^2$, $R^4$ and $R^5$ are as described above.

Formula II
General Structure of Polyester

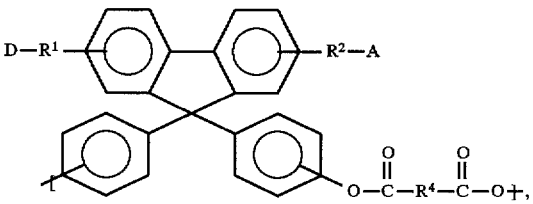

-continued
Formula II
General Structure of Polyester
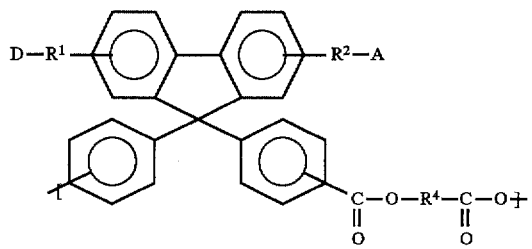
Formula III
General Structure of Polycarbonates
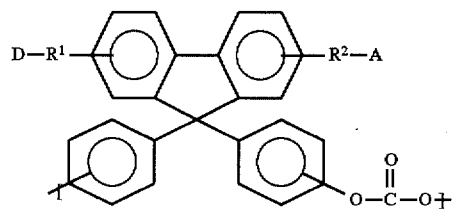
Formula IV
General Structure of Polyamides
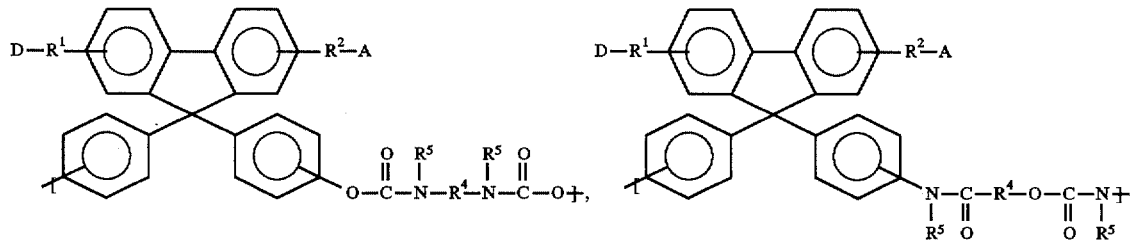
Formula V
General Structure of Polyethers
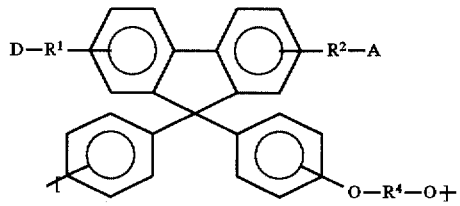
Formula VI
General Structure of Polyurethanes
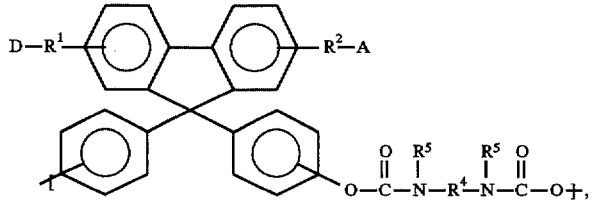
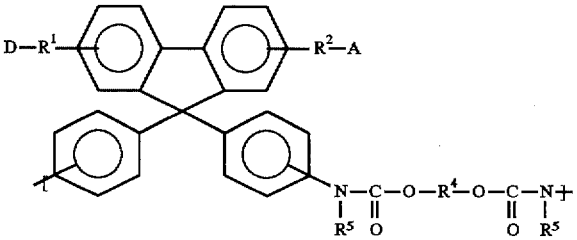

Formula VII
General Structure of Polyureas
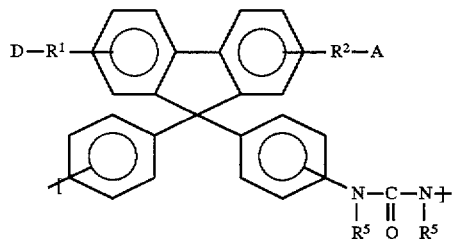
Formula VIII
General Structure of Polyimides
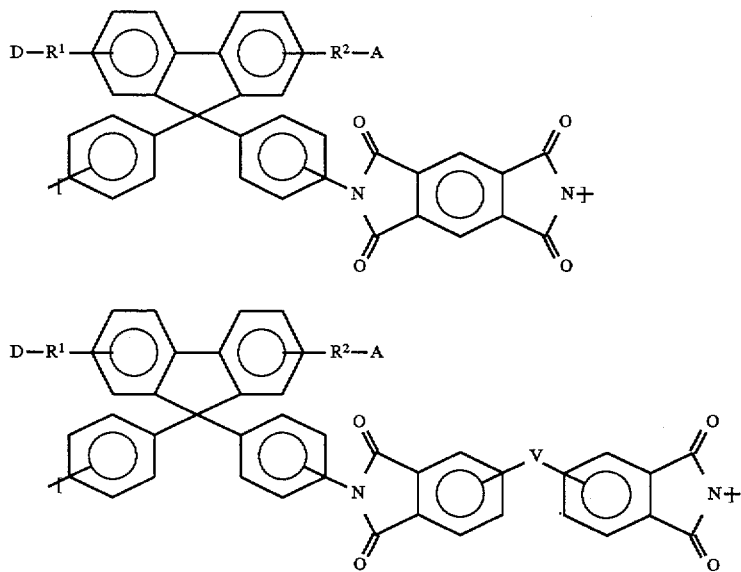
Formula IX
General Structure of Epoxy Resins
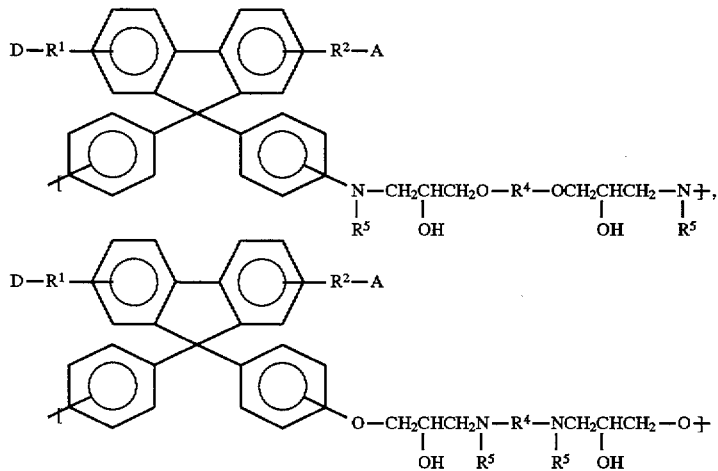

-continued

Formula IX
General Structure of Epoxy Resins

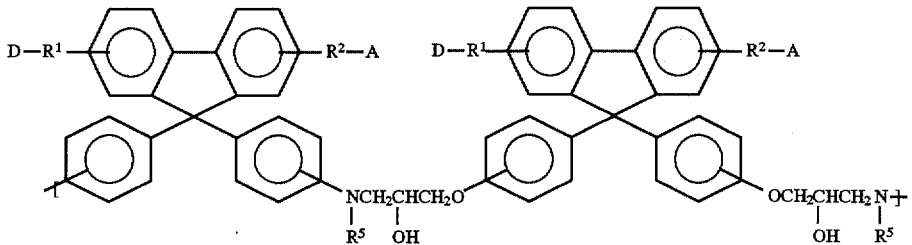

When the $R^5$ in Formula IX, is a hydrogen, the polymer is a thermoset resin, when $R^5$ is a alkyl group, the polymer is a thermoplastic.

The relative electron withdrawing and electron donating properties of A and D, and the length of conjugation of $R^1$ and $R^2$ impact on the non-linear optical properties of the polymer. In general, the greater the conjugation length of $R^1$ and $R^2$ and the greater the electron withdrawing properties of A and the greater the electron donating properties of D, the greater the second order non-linear properties of the polymer. Accordingly, in the preferred embodiments of the invention, A, D, $R^1$ and $R^2$ substituents are selected to maximize the second order non-linear properties of the polymer.

The nature of the Z and T groups impact on the glass transition temperature (Tg) of the polymer. For example, by increasing the length and flexibility of the $R^4$ component of Z the Tg can be decreased and by decreasing the length and flexibility of the $R^4$ component the Tg be increased. In general, for applications utilizing the second order NLO property of polymers, higher Tg's are preferred to prevent depoling of the poled polymer films at working temperatures.

Preferred polymers of this invention are those of the Formula I wherein:

A is an electron withdrawing group, at least one of which is substituted at the 7 position or A is substituted to a $R^2$ group substituted of the 7 position;

D is an electron donating group at least one of which is substituted at the 2 position or D substituted to a $R^1$ which is substituted at the 2 position;

$R^1$ and $R^2$ are the same or different and are conjugated organic or inorganic, aromatic, ethylenically and acetylenically unsaturated aliphatic, heteroaromatic, aromatic vinylene or heteroaromatic vinylene radicals;

$R^3$ is hydrogen, deuterium, halogen, or substituted or unsubstituted alkyl, alkoxy, cycloalkyl, alkoxyalkyl, phenoxyalkyl or phenylalkyl wherein permissible substituents are one or more fluorines;

$R^4$ is substituted or unsubstituted alkylene or arylene wherein the hydrogen atoms are optionally replaced by one or more fluorines;

$R^5$ and $R^6$ are the same or different and are hydrogen, deuterium, alkyl or alkyl substituted with one or more fluorines;

j and k are 4:
p is 3;
i, m, n, o and u are 1;
x and y are the same or different and are 0 or 1;
Z is a moiety of the formula: $OR^4$—;

Q and T are the same or different and are selected from the group consisting of —N($R^5$)C(O)—, —C(O)N($R^5$)—,
—OC(O)N($R^5$)—, —N($R^5$)C(O)O—, —C(O)—, —C(O)O—, —OC(O)—, —O—, —N($R^5$)CH$_2$CH(OH)CH2O—, —OCH2CH(OH)CH2N($R^5$)—, —N($R^5$)C(O)N($R^5$)—, —OC(O)O— or

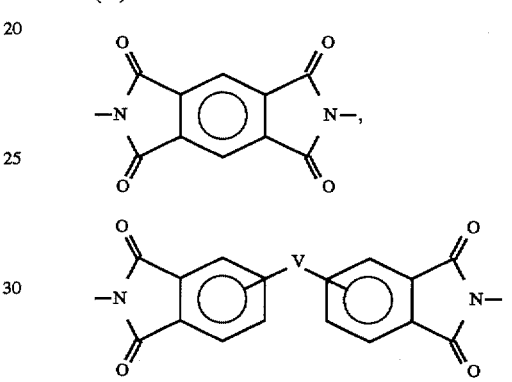

where V is —O—, —OC(O)—, —(O)CO—, —C(O)—, —CR$^5$R$^6$—, —SiR$^5$R$^6$—, —NR$^5$—, —S—, —NR$^5$C(O)—, —SO— or —SO$_2$—.

More preferred polymers of this invention are those of the Formula I wherein;

A is —NO$_2$, —CO$_2$R$^5$—, —SO$_2$R$^5$, —CN, —C(O)R$^5$, —C(CN)=C(CN)$_2$, —CH=C(CN)$_2$ or perfluoroalkyl, where $R^5$ is hydrogen, deuterium, alkyl, or perfluoroalkyl;

D is —NR$^5$R$^6$, —OR$^5$, —SR$^5$ or

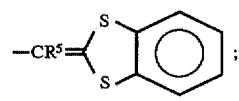

$R^1$ and $R^2$ are the same or different and are azo, substituted or unsubstituted phenylene, dimethylenephenylene, phenoxyphenylene, 2,2-diphenylene propane, benzofurylene, benzylidyne, benzylidene, benzoylene, phenylenediazo, propenylene, vinylene, phenylenevinylene, furylene, pyrylene, pyrimidylene, quinolylene, pyranylene, pyranylenevinylene, thienylene, thienylenevinylene, pyridinylene, biphenylene, naphthylene, thienylene vinylene, phenylene vinylene, —(CR$^7$=CR$^7$)$_a$— or —(—C=C)$_b$—, wherein a and b are the same or different and are integers from 1 to about 10 and $R^7$ is the same or different at each occurrence and is hydrogen, alkyl or aryl wherein permissible substituents are alkyl, alkoxy, halogen, deuterium, perfluoroalkyl, alkoxyalkyl, or aryl;

$R^3$ is hydrogen, deuterium, halogen, or substituted or unsubstituted alkyl, alkoxy, cycloalkyl, alkoxyalkyl, phenoxyalkyl or phenylalkyl wherein permissible substituents are one or more fluorines;

$R^4$ is substituted or unsubstituted alkylene or arylene wherein the hydrogen atoms are optionally replaced by one or more fluorines;

$R^5$ and $R^6$ are the same or different and are hydrogen, deuterium, alkyl or alkyl substituted with one or more fluorines;

j and k are 4;

p is 3;

i, m, n, and o are 1;

x and y are the same or different and are 0 or 1;

Z is a moiety of the formula: —Q-$R^4$—; Q and T are the same or different and are selected from the group consisting of —N($R^5$)C(O)—, —C(O)N($R^5$)—, —OC(O)N($R^5$)—, —N($R^5$)C(O)O—, —C(O)—, —C(O)O—, —OC(O)—, —O—, —N($R^5$)CH$_2$CH(OH)CH2O—, —OCH$_2$CH(OH)CH2N($R^5$)—, —N($R^5$)C(O)N($R^5$)—, —OC(O)O— or

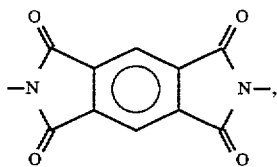

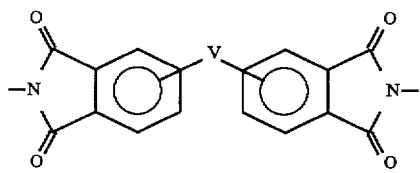

where V is —O—, —OC(O)—, —(O)CO—, —C(O)—, —C$R^5R^6$—, —Si$R^5R^6$—, —N$R^5$—, —S—, —N$R^5$C(O)—, —SO— or —SO$_2$—.

Most preferred polymers of this invention are those of the Formula I in which:

A is —NO$_2$, —SO$_2R^5$, —CN, —C(CN)=C(CN)$_2$ or —CH=C(CN)$_2$ where $R^5$ is alkyl or perfluoroalkyl;

D is —N$R^5R^6$, —O$R^5$, or

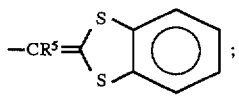

$R^1$ and $R^2$ are the same or different and are —CH=CH—, —C≡C—, substituted unsubstituted phenylene, furylene, pyrylene or thienylene;

$R^3$ is hydrogen or deuterium;

$R^4$ is substituted or unsubstituted alkylene or arylene wherein the hydrogen atoms are optionally replaced by are one or more fluorines;

$R^5$ and $R^6$ are the same or different and are hydrogen, deuterium, alkyl or alkyl substituted with one or more fluorines;

j and k are 4;

p is 3;

i, m, n, and o are1;

x and y are the same or different and are 0 or 1;

Z and T are substituted at the 4' and 4" positions;

Z is a moiety of the formula: —Q—$R^4$—;

Q and T are the same or different and are selected from the group consisting of —N($R^5$)C(O)—, —C(O)N($R^5$)—, —OC(O)N($R^5$)—, —N($R^5$)C(O)O—, —C(O)O—, —O—, —OC(O)—, —N($R^5$)CH$_2$CH(OH)CH2O—, —OCH2CH(OH)CH2N($R^5$)—, —N($R^5$)C(O)N($R^5$)—, —OC(O)O— or

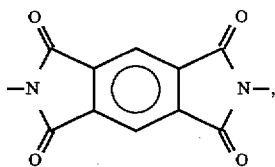

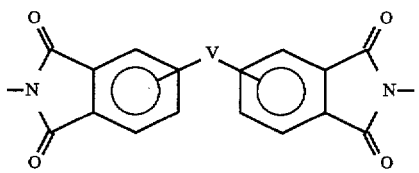

where V is —O—, —C(O)—, —CH$_2$—, —C(CH$_3$)$_2$—, —C(CF$_3$)$_2$—, or —SO$_2$—.

The number of repeat units in the polymer of this invention is not critical and can vary widely. The number of repeat units is normally equal to or greater than 2. The number of repeat units is preferably from about 2 to about 10,000, more preferably from 2 to about 5,000 and most preferably from about 2 to about 2,000.

The polymer of this invention exhibits non-linear optical properties especially second order properties as measured by electro-optical coefficient and/or second harmonic generation (SHG) coefficient as described in C. Wu, A. Nahata, M. J. McFarland, K. Horn and J. T. Yardley, U.S. Pat. No. 5,061,404, and also in A. Nahata, C. Wu and J. T. Yardley, IEEE Trans. Instrum. and Measurement, 41, (1992), p.128, which are hereby incorporated for reference.

The polymers of this invention exhibit a glass transition temperature (Tg) of at least about 100° C. as measured by differential scanning calorimetry (DSC), thermal mechanical analysis (TMA), or thermal dielectrical relaxation measurements. The Tg of the polymers of this invention is preferably from about 100° C. to about 350° C., more preferably from about 150° C. to about 350° C. and most preferably from about 150° C. to about 300° C.

The polymer of this invention can be prepared by any suitable method. In the preferred embodiments of the invention, the polymer of this invention is prepared by reacting an unsymmetrical substituted fluorene monomer of the formula X:

Formula X
Monomers

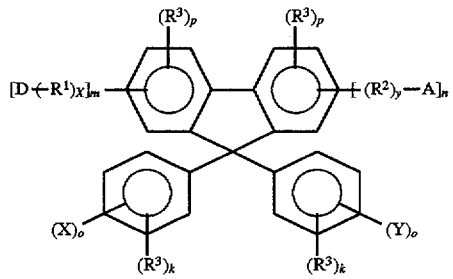

where A, D, $R^1$ $R^2$, $R^3$, k, m, n, o, x, and y are as described above and X and Y are the same or different and are nucleophilic or electrophilic moieties such as

—NH$_2$, —NH$R^5$, —SH, —OH, —NCO, —CO$_2$H,

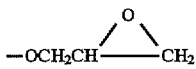

with a condensation monomer having two moieties which are reactive with X and Y such as those monomers selected from the group consisting of:

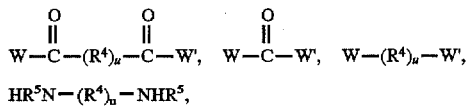

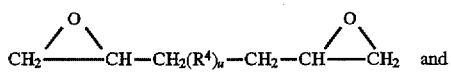

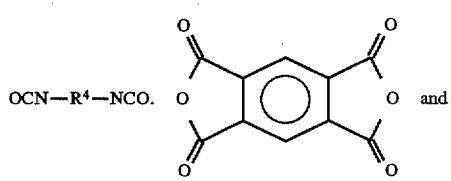

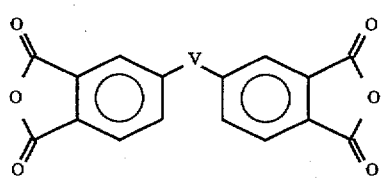

wherein W and W' are leaving groups such as —OR$^5$ (where R$^5$ is hydrogen, alkyl, or phenyl, substituted or unsubstituted), or halogen and under appropriate condition of temperature, pressure and the like to allow condensation reaction of the reactants to form the polymer.

Exemplary embodiments of condensation polymerization which can be used in the preparation of the polymers of this invention are schematically shown below.

The preparation of polyesters is exemplified in Scheme 1. This is the simplest case in which A is a nitro, D is a dimethylamino group and they are directly bounded to the two separate phenyl rings of a fluorenyl moiety (R$^1$, R$^2$=nothing).

Three methods can be used for condensation. The first and second methods which are interfacial and solution condensation between acid halides and phenols, respectively, were traditional. The third method utilized activated acid esters such as the acid ester with 4-nitrophenol to replace the acid halides, it was originally reported by V. V. Korshak and V. A. Vasnev (Vysokomol. Soedin. Ser. B, 24 [1982], 198, cited in V. V. Korshak and V. A. Vasnev, "Comprehensive Polymer Science", G. Allen and J. C. Bevington ed. Vol.5, Chapter 10, p. 147–152, Pergamon Press, 1989, which is hereby incorporated for reference) and was less employed in polyester synthesis. We found this method convenient since the condensation proceeded smoothly at room temperature to obtain high yield of polymers and particularly, unlike the first two methods, no ionic species are formed in the reaction. The complete removal of ionic contaminants is a special concern for EO polymers as the polymer films are subject to high voltage poling at above glass transition temperature.

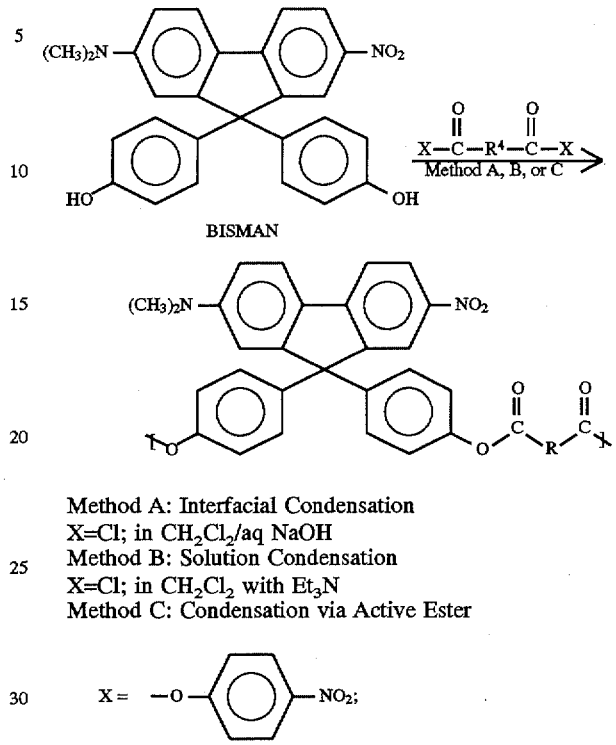

Method A: Interfacial Condensation
X=Cl; in CH$_2$Cl$_2$/aq NaOH
Method B: Solution Condensation
X=Cl; in CH$_2$Cl$_2$ with Et$_3$N
Method C: Condensation via Active Ester Besides 4-nitrophenol ester, the following active esters can also be used, as shown in Scheme 2.

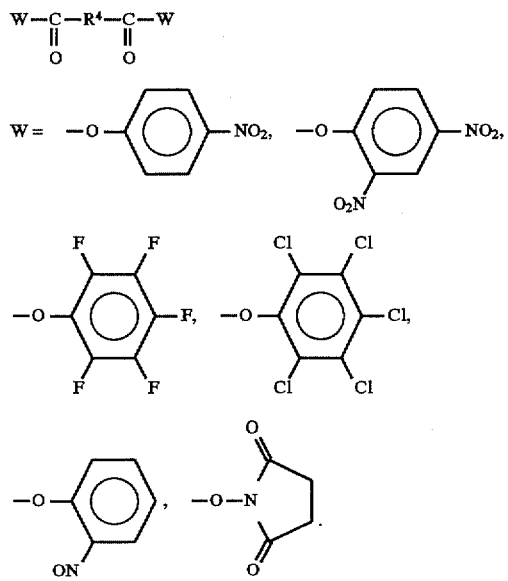

Several examples (Example 1–14) of polyesters are listed in Table 1. By varying the size of R$^4$, glass transition temperatures of polymer can be adjusted to any temperature between 150°–220° C. These polyesters exhibited strong second order NLO, particularly EO and SHG activities, as illustrated in Example 15–18.

The preparation of polycarbonates is exemplified in Scheme 3, again this is the simplest case. Among the three methods used the active ester method is preferred. The polycarbonate made according to Example 19 also exhibited strong EO activity, as shown in Example 20.

The preparation of the simplest case of polyamides is exemplified in Scheme 4. The active ester method is again preferred. The polyamide made according to Example 21 ($R^5$=H) also exhibited strong EO activity, as shown in Example 22.

TABLE 1

Preparation of Polyesters

| Exam. | $R^4$ | W | Method | Yield, % | Tg, °C. |
|---|---|---|---|---|---|
| 1 | —(CH$_2$)$_2$— | Cl | A | 71 | 239 |
| 2 | —(CH$_2$)$_2$— | Cl | B | 59 | 243 |
| 3 | —(CH$_2$)$_2$— | 4-Nitro-phenoxy | C | 98 | 217 |
| 4 | —CH=CH— | Cl | A | 76 | 222 |
| 5 | Nothing | Cl | A | 27 | 193 |
| 6 | 0.5 eq —(CH$_2$)$_2$— 0.5 eq —(CH$_2$)$_3$— | 4-Nitro-phenoxy | C | 81 | 205 |
| 7 | —(CH$_2$)$_3$— | 4-Nitro-phenoxy | C | 88 | 185 |
| 8 | 0.5 eq —(CH$_2$)$_3$— 0.5 eq —(CH$_2$)$_4$— | 4-Nitro-phenoxy | C | 89 | 171 |
| 9 | —(CH$_2$)$_4$— | Cl | B | 71 | 168 |
| 10 | —(CH$_2$)$_4$— | 4-Nitro-phenoxy | C | 87 | 154 |
| 11 | 0.5 eq —(CH$_2$)$_2$— 0.5 eq 1,3-phenylene | Cl | A | 66 | 251 |
| 12 | 1,3-phenylene | Cl | A | 70 | >250 |
| 13 | —(CF$_2$)$_2$— | Cl | A | 81 | — |
| 14 | —(CF$_2$)$_3$— | Cl | A | 80 | — |

Scheme 3
Making of Polycarbonate

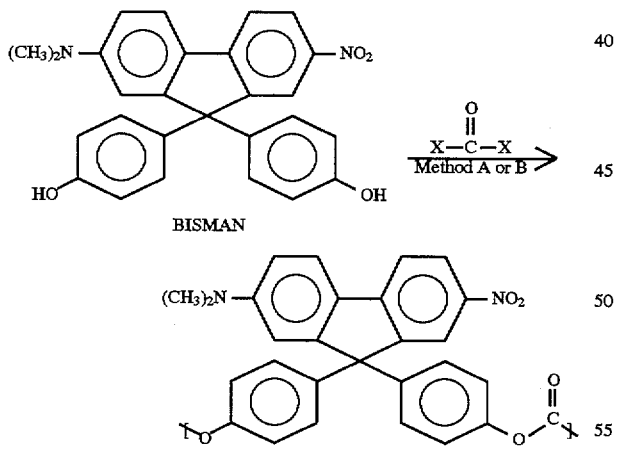

Method A: Solution Condensation
X=Cl; in CH$_2$Cl$_2$ with Et$_3$N
Method B: Condensation via Active Ester

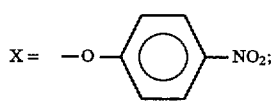

in CH$_2$Cl$_2$ with Et$_3$N

Scheme 4
Making of Polyamides

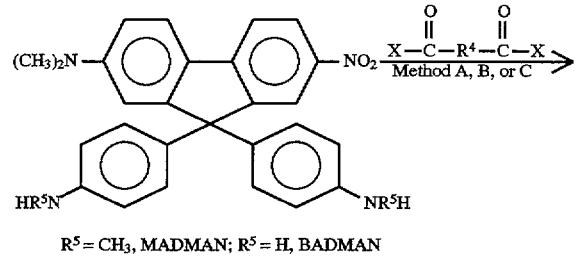

$R^5$ = CH$_3$, MADMAN; $R^5$ = H, BADMAN

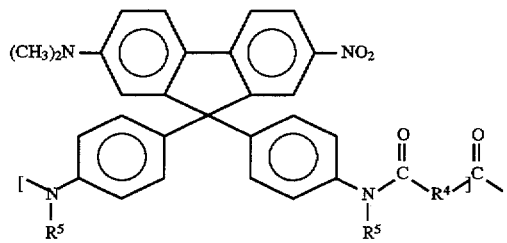

Method A: Interfacial Condensation
X=Cl; in CH$_2$Cl$_2$/aq NaOH
Method B: Solution Condensation
X=Cl; in DMF with Et$_3$N
Method C: Condensation via Active Ester

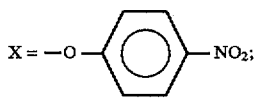

in DMF with Et$_3$N

The preparation of the simplest case of polyethers is exemplified in Scheme 5 (Example 23).

Scheme 5
Making of Polyethers

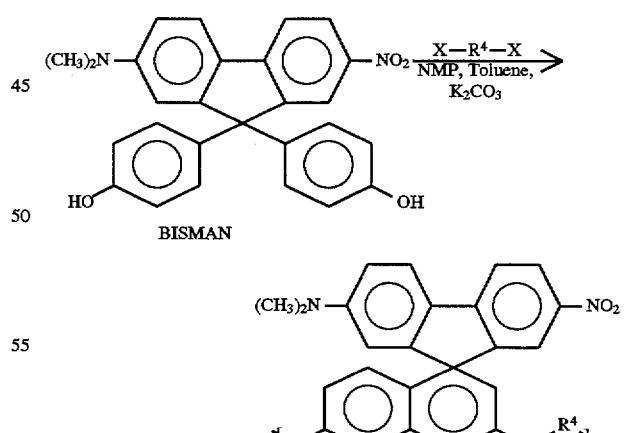

X=Br; I; R=Alkyl, Perfluoroalkyl;
X=F; R=Perfluoroalkyl.

The preparation of the simplest case of epoxy resins are exemplified in Scheme 6. Depending upon the nature of $R^5$ being a hydrogen or an alkyl, the resulted polymer can be either a linear themoplastic (Example 24 and 25) or a crosslinked thermoset resin (Example 26).

Scheme 6
Making of Epoxy Resins
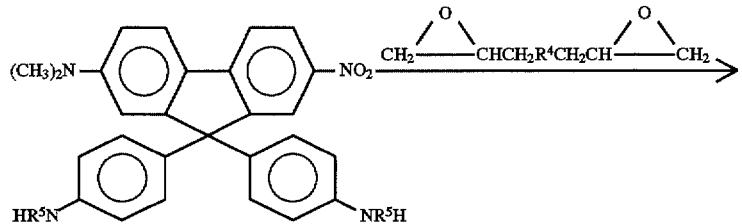
R⁵ = CH₃, MADMAN; H, BADMAN
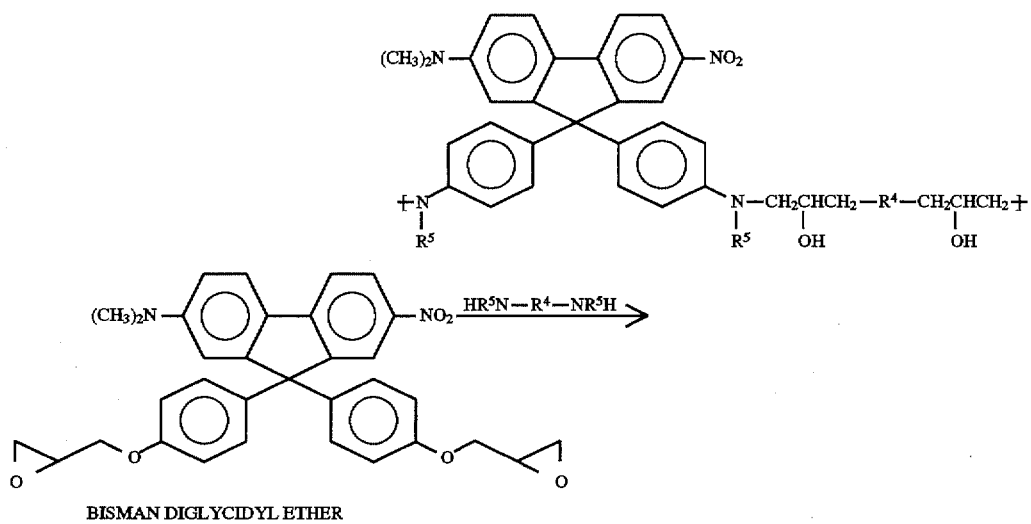
BISMAN DIGLYCIDYL ETHER
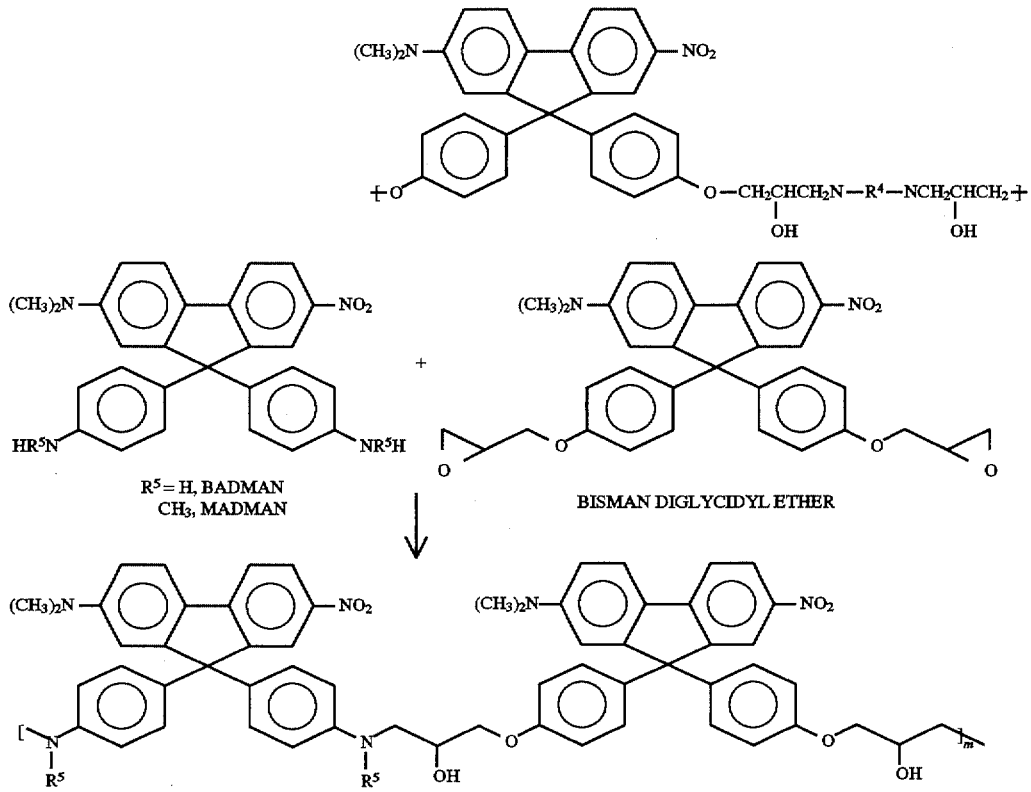
R⁵ = H, BADMAN
CH₃, MADMAN
BISMAN DIGLYCIDYL ETHER The unsymmetrically substituted fluorene monomers and the other reagent can be prepared by known techniques. For example, the fluorene monomer can be prepared in accordance with the procedure of copending U.S. patent application Ser. No.983,065, filed Nov. 27, 1992.

The polymers of this invention can be used for any purpose where polymers having non-linear optical properties, especially those having second order activity have utility. See for example, U.S. Pat. Nos. 5,061,404; 4,773,743, which are hereby incorporated for reference, For example, the polymers can be fabricated into non-linear optical medium comprising a substrate of the polymer of this invention using suitable film or coating techniques, for example, such medium can be fabricated by solution coating, gel coating such as spin-coating or dip coating a solution of the polymer on to a suitable substrate to form a polymeric thin film, which later acquiring a non-centrosymmetric orientation by an external electric field poling so as to exhibit high electro optic response.

The non-linear optical medium of this invention can be used as the polymeric non-linear optical component within optical devices which include such components. Such devices include electro-optic modulators, electro-optic switches, etc., used in optical communication system, electronic computer interconnection, laser and fiber optic gyroscopes and other systems known to those who practice the art.

In general, electro-optic polymers of this invention may be utilized to provide an interface between electrical and optical information. Thus electro-optic polymers of this invention may be used in a variety of ways to alter the propagation of a beam of light. Examples, include electro-optic lenses and electro-optic materials in optical waveguides wherein light is modified or changed as it passes through a region in which it is confined by appropriate index of refraction variations.

Important types of changes include rotation or alteration of the state of optical polarization, modulation of the amplitude of the optical intensity, modulation of the phase of the optical radiation, alteration of the directional characteristics of the radiation, and alteration of the frequency (or wavelength) of the radiation. By altering the properties of the radiation within a waveguide or a waveguide region, it is possible to encode and decode information and to route it as desired.

Non-linear optical polymers of this invention can also be utilized in devices which exploit their higher order responses to incident radiation. These responses include non-linear refractive index changes, frequency alteration and non-linear absorption coefficients. For frequency alteration processes such as second harmonic generation (frequency doubling) it is required that the non-linear material be non-centrosymmetric. This type of structure can be achieved by poling polymers with non-linear optical transducers. Examples of important non-linear optical devices are power limiters, harmonic generators, all-optical switches and non-linear optical waveguide switches.

Electro-optically active materials provide the capability for using electric signals to change or alter the propagation of light within a medium. Of particular interest are devices which provide for external control of light within an optical waveguide though the application of an electric field. Examples of such devices and design criteria for some of these devices are known to those skilled in the art. Examples include amplitude modulators, phase modulators, Mach-Zehnder interferometers, and evanescent switches.

The following examples are presented to better illustrate the invention and should not be construed as limitations thereon.

EXAMPLE 1

Interfacial Polycondensation of 9,9-Bis-4-hydroxyphenyl-2-dimethylamino-7-nitrofluorene (BISMAN) With Succinyl Chloride (Method A)

One part of BISMAN, 1.8 parts of 10% aqueous sodium hydroxide, 0.38 part of tetraethylammonium chloride monohydrate and 6 parts of water were stirred at 50 ° C. until homogeneous. The red solution was transferred into a Warner blender. To this mixture was added quickly with vigorous stirring 0.375 part of succinyl chloride in 8 parts of methylene chloride. The molar ratio of bisphenol: sodium hydroxide: diacid chloride: tetraethylammonium chloride was 1:2:1:1. Polymer was precipitated on the walls of the blender. After 5 minutes, 60 parts of hexane was added and the precipitated polymer was collected, washed and dried. The yield was 0.85 part (71%). The polymer was purified by dissolving in 5 parts of DMF and precipitated with 300 parts methanol. The purification process was repeated 3 times. The glass transition temperature of the polymer as determined by thermal mechanical analysis was 239° C.

EXAMPLE 2

Solution Polycondensation of 9,9-Bis-4-hydroxyphenyl-2-dimethylamino-7-nitrofluorene (BISMAN) With Succinyl Chloride (Method B)

One part of BISMAN was dissolved in a mixture consisting of 8 parts of anhydrous methylene chloride and I part of DMF. To this solution was added 0.46 part of triethylamine in 4 parts of methylene chloride. The reaction vessel was stirred in an ice bath while 0.355 part of succinyl chloride in 8 parts of methylene chloride was added through an additional funnel. The reaction mixture was stirred for 1 hour after the addition, then another 1.5 hours at room temperature. The polymer was precipitated and collected by adding the reaction mixture into 300 parts of methanol. The polymer was 0.7 part (59%) and was further purified by dissolving in DMF and precipitated with methanol. The glass transition temperature as determined by TMA was 243° C.

EXAMPLE 3

Homogeneous Polycondensation of 9,9-Bis-4-hydroxyphenyl-2-dimethylamino-7-nitrofluorene (BISMAN) With Di-4-nitrophenyl Succinate (Method C)

Di-4-nitrophenyl succinate was prepared from succinyl chloride and equimolar of p-nitrophenyl in the presence of 2 eq. of triethylamine in tetrahydrofuran at room temperature by a procedure similar to those reported by M. Ueda, K. Okada and Y. Imai, J. Poly. Sci. Poly. Chem. Ed. 14, 1976, p.7665. The compound was further purified by recrystallization in methanol. One part of BISMAN and 0.820 part of di-4-nitrophenyl succinate was stirred in 8 parts of dichloroethane. To this dispersion was added 0.464 part of triethylamine. The mixture was stirred at room temperature for 48 hours during which period the mixture was turned into a homogeneous solution. The polymer was precipitated by adding the solution to 300 parts of methanol and the collected precipitate was washed with methanol and hexane. The polymer was 1.17 part (98%) was further purified by dissolving in DMF and precipitated with methanol. The glass transition temperature as measured by TMA was 217° C.

EXAMPLES 4–11

By using interfacial condensation (method A), solution condensation (method B), and condensation via active ester (method C), as exemplified in Example 1–3, Examples 4–11 were performed and the results are listed in Table 1.

EXAMPLE 12

By the same procedure as Example 1, from 1 part of BISMAN and 0.463 part of isophthaloyl chloride, there is obtained 0.9 part of a solid polymer which has a glass transition temperature higher than 250° C.

EXAMPLE 13

Following the same procedure as described in Example 2, from 1 part of BISMAN and 0.518 part of perfluorosuccinyl chloride, there is obtained 1.1 parts of polymer.

EXAMPLE 14

Following the same procedure as described in Example 2, from 1 part of BISMAN and 0.632 part of perfluoroglutaryl chloride, there is obtained 1.2 parts of polymer.

EXAMPLE 15

Measurement of the Electro-optic Coefficient of Polymer in Example 7

A solution composed of four parts dimethylacetamide and one part copolymer, prepared as described in Example 7, was spin cast onto a quartz substrate containing aluminum electrode pads. The aluminum was photolithographically defined to form thin film slit type electrodes with dimensions of 5 mm×9 mm, distance between the electrodes of 25 microns, and thickness of 0.1 microns. The spin cast film was annealed at 135° C. for thirty minutes yielding a 0.7 micron thick solid polymer film.

The sample was placed in a vacuum chamber with the pressure reduced to $10^{-6}$ Torr. Electrical connections were made to the two aluminum electrodes in the vacuum chamber and the sample was heated to the polymer glass transition temperature of 187° C. A DC voltage was established between the two aluminum electrodes such that the polymer in the gap region experienced a static electric field strength of 0.5 MV/cm. The field was maintained until the sample was cooled to room temperature.

The poled sample was mounted in a modified Senarmont compensator apparatus used for measuring the electro-optic coefficients. Details of its operation have been described elsewhere (A. Nahata, C. Wu, and J. T. Yardley, IEEE Trans. Instrum. Meas., 41, [1992], 128–131, attached). A 0.81 micron laser diode was used to make the measurements. The measured phase retardation versus applied voltage showed a linear relationship, establishing that the polymer was noncentrosymmetrically aligned and optically nonlinear.

The refractive index of the polymer was measured with a Metricon PC-2000™. At 0.81 microns, the refractive index of the polymer was 1.6676. The observed electro-optic coefficient, $r_{33}$, was $r_{33}=2.6$ pm/V.

EXAMPLE 16

Measurement of the Electro-optic Coefficient of the Polymer in Example 3

Following the procedure in Example 15, the electro-optic coefficient of the polymer described in Example 3 and poled at 217° C. was measured as:

$r_{33}=2.6$ pm/V.

EXAMPLE 17

Measurement of the Electro-optic Coefficient of the Polymer in Example 6

Following the procedure in Example 15, the electro-optic coefficient of the polymer described in Example 6 and poled at 205° C. was measured as:

$r_{33}=2.6$ pm/V.

EXAMPLE 18

Second Harmonic Generation From the Polymer in Example 7

The solution from Example 15 was spin cast onto a transparent substrate consisting of Corning 7059 glass with a 300 Angstrom thick layer of electrically conductive indium tin oxide (ITO). The residual solvent was removed by baking the coated substrate in a convection oven at 135° C. for 30 minutes. The dried film had a thickness of 1.0 micron. A small portion of the polymer film, approx. 2 mm×2 mm, was removed, leaving ITO exposed for electrical connection. The substrate was placed on a grounded metal hot plate with indium wire used to ground the ITO layer and heated to 187° C. The polymer was corona poled using a 25 micron diameter corona wire placed approx. two inches above the sample and a control grid placed approx. half an inch above the polymer surface. A corona discharge was achieved by applying 5000 volts DC to the corona wire. The effective poling voltage was determined by the voltage applied to the grid wires. In this example, the polymer experienced a static electric field strength of 1.0 MV/cm. The electric field, was maintained until the sample was cooled to room temperature.

The sample was thus rendered noncentrosymmetric by the above poling steps and, as such, was capable of acting as a nonlinear optical device capable of optical frequency conversion. This was verified by placing the sample in the beam path of a 1.057 micron pulsed laser so that the laser beam passed through the poled region. When the sample was tilted so that the noncentrosymmetric axis of the film was at an angle to the 1.057 micron laser beam, it produced light at 0.5285 microns (double the input frequency). The sample demonstrated maximum frequency doubling capability at an angle of about 60° with respect to the incident laser beam. This type of frequency doubling verified the noncentrosymmetric nature of the poled polymer films of the invention. It also illustrated the utility of this material for optical frequency doubling devices.

EXAMPLE 19

Homogeneous Polycondensation of BISMAN With Bis-4-nitrophenylcarbonate

One part of BISMAN and 0.690 part of bis-4-nitrophenylcarbonate were stirred in 8 parts of methylene chloride. To this solution was added 0.464 part of triethylamine. The mixture was stirred at room temperature for 48 hours. The polymer was precipitated by adding the solution to 300 parts of methanol and the collected precipitate was washed with methanol and hexane. The polymer, 0.95 part (91%), was further purified by dissolving in DMF and precipitated with methanol. The glass transition temperature as measured by TMA was 278° C.

EXAMPLE 20

Measurement of the Electro-optic Coefficient of the Polymer in Example 19

Following the procedure described in Example 15, the electro-optic coefficient of the polymer described in Example 19 and poled at 260° C. was measured as:

$r_{33}$=2.8 pm/V.

EXAMPLE 21

Homogeneous Polycondensation of 9,9'-(Bis-4-aminophenyl)-2-dimethylamino-7-nitrofluorene (BADMAN) With Bis-4-nitrophenyladipate One part of BADMAN and 0.886 part of bis-4-nitrophenyladipate were stirred in 6 parts of N,N-dimethylacetamide. To this solution was added 0.464 part of triethylamine. The mixture was stirred at 70° C. for 72 hours. The polymer was precipitated by adding the solution to 300 parts of methanol and the collected precipitate was washed with methanol and hexane. The polymer, 0.80 part (80%), was further purified by dissolving in DMF and precipitated with methanol. The glass transition temperature as measured by TMA was 255° C.

EXAMPLE 22

Measurement of the Electro-optic Coefficient of the Polymer in Example 21

Following the procedure described in Example 15, the electro-optic coefficient of the polymer described in Example 19 and poled at 255° C. was measured.

$r_{33}$=2.1 pm/V.

EXAMPLE 23

Condensation of 9,9'-(bis-4-Hydroxyphenyl)-2-Dimethylamino-7-Nitrofluorene (BISMAN) With Decafluoro-biphenyl One part of BISMAN, 0.95 part of anhydrous potassium carbonate and 0.80 part of decafluoro-biphenyl are refluxed in a solvent mixture consisted of 8 parts of N-methylpyrolidone and 2 parts of toluene for 12 hours. Water formed is removed by a Dean-Stork attachment. After the reaction toluene is removed by distillation. The residue is stirred with 100 parts of water and polymer was obtained by filtration. The polymer was purified by repeatedly dissolving in NMP and precipitated form water and methanol.

EXAMPLE 24

Linear Epoxy Polymers from Condensation of 9,9'-(Bis-4-N-methylaminophenyl)-2-dimethylamino-7-nitrofluorene (MADMAN) With Diglycidylether of 9,9'-(Bis-4-hydroxyphenyl)-2-dimethylamino-7-nitrofluorene (BISMAN Diglycidylether)

One part of BISMAN diglycidylether and 0.85 part of MADMAN were stirred in 25 parts of dimethylacetamide at 100° C. for 48 hours. The homogeneous solution was poured to 200 parts of methanol to precipitate the polymer. The polymer, 1.42 part (77%), was further purified by dissolving in DMF and precipitated with methanol. The glass transition temperature as measured by TMA was 208° C.

EXAMPLE 25

Linear Epoxy Polymers from Condensation of 9,9'-(Bis-4-N-methylamino-phenyl)-2-dimethylamino-7-nitrofluorene (MADMAN) With Bisphenol-A Diglycidylether One part of BADMAN and 0.75 part of bisphenol-A diglycidylether (DER-330 resin from Dow) were stirred in 10 parts of diglyme at 100° C. for 96 hours and then at 140° C. for 14 hours. The homogeneous solution was filtered through a 0.2 micron Teflon filter and poured into 200 parts of methanol. The polymer, 0.43 part (25% yield), was further purified by dissolving in DMF and precipitated with methanol. The glass transition temperature as measured by TMA was 162° C.

EXAMPLE 26

Crosslinked Epoxy Resin of 9,9'-(bis-4-aminophenyl)-2-Dimethylamino-7-Nitrofluorene (BADMAN) With 9,9'-(Bis-4-hydroxyphenyl)-2-dimethylamino-7-nitrofluorene (BISMAN Diglycidylether)

One part of BISMAN diglycidylether and 0.884 part of 9,9'-(bis-4-aminophenyl)-2-dimethylamino-7-nitrofluorene (BADMAN) were heated to melt on an oil bath and stirred at 150° C. under nitrogen. The mixture solidified after 1 hour. The temperature of the bath was raised to 250° C. and maintained for 12 hours. The polymer was insoluble in all organic solvents tested.

What is claimed is:

1. A polymer comprising recurring units of the formula:

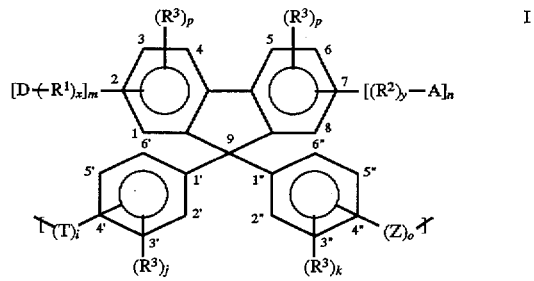

wherein:

A is an electron withdrawing substituent selected from the group consisting of —$NO_2$, —$CO_2R^{12}$, —$SO_2R^{12}$, —CN, —$C(O)R^{12}$, —$C(CN)=C(CN)_2$, —$CH=C(CN)_2$ and perfluoroalkyl, where $R^{12}$ is hydrogen, deuterium, alkyl, or perfluoroalkyl;

D is an electron donating substituent selected from the group consisting of
—$NR^{13}R^{14}$, —$OR^{13}$, —$SR^{13}$ and

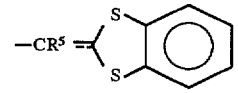

wherein $R^{13}$ and $R^{14}$ are the same or different and are hydrogen, deuterium, alkyl or aryl;

$R^1$ and $R^2$ are the same or different and are divalent conjugated organic or inorganic moiety;

m, n and p are the same or different at each occurrence and are integers from 1 to 3 wherein the sum of p and n, as well as the sum of p and m, is equal to 4;

k and o are the same or different at each occurrence and are integers from 1 to 4 wherein the sum of k and o is equal to 5;

l and j are the same or different and are 0 or an integer from 1 to 5 wherein the sum of i and j is equal to 5;

$R^3$ is the same or different at each occurrence and is a monovalent moiety;

x and y are the same or different and are 0 or an integer from 1 to about 10;

Z is the same or different at each occurrence and is a moiety of the formula:

—OR$^4$ or —O—;

Q and T are the same or different and are selected from the group consisting of divalent moieties of the formula: —O—, —OC(O)—, —C(O)O—, —C(O)—, —SiR$^5$R$^6$—, —NR$^5$R$^6$—, —S—, —NR$^5$C(O)—, —C(O)NR$^5$—, —N=N—, —CH=N—, —SO—, —SO$_2$—, —N(R$^5$)C(O)N(R$^5$)—, —OCH$_2$CH(OH)CH$_2$—, —CH$_2$CH(OH)CH$_2$O—,

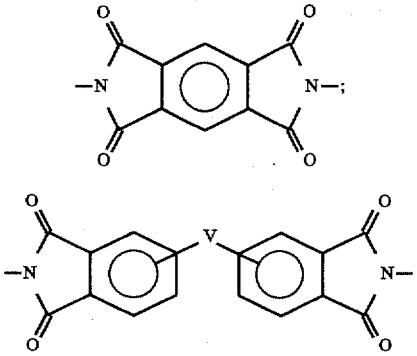

—OC(O)N(R$^5$)—, —N(R$^5$)C(O)O—, —N(R$^5$)CH$_2$CH(OH)CH$_2$O—, —OCH$_2$CH(OH)CH$_2$(R$^5$)—, —OC(O)O— wherein V is —O—, —OC(O)—, —(O)CO—, —C(O)—, CR$^5$R$^6$, —SiR$^5$R—, —NR$^5$—, —S—, —NR$^5$C(O)—, —SO— or —SO$_2$—;

R$^4$ is a divalent hydrocarbon radical;

R$^5$ and R$^6$ are monovalent moieties and are the same or different at each occurrence.

2. The polymer of claim 1 wherein A is an electron withdrawing group, at least one of which is substituted at the 7 position when y is 0 or A is substituted to a R$^2$ group which is substituted at the 7 position when y is from 1 to 10; and D is an electron donating group at least one of which is substituted at the 2 position when x is 0 or D is substituted to a R$^1$ group which is substituted at the 2 position when x is from 1 to 10.

3. The polymer of claim 2 wherein A is —NO$_2$, —SO$_2$R$^{12}$—, —CN, —C(CN)=C(CN)$_2$ or —CH=C(CN)$_2$ where R$^{12}$ is alkyl or perfluoroalkyl; and D is —NR$^{13}$R$^{14}$, —OR$^{13}$, or

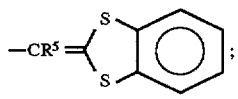

where R$^{13}$ and R$^{14}$ are the same or different and are hydrogen, deuterium, or alkyl.

4. The polymer of claim 1 wherein R$^1$ and R$^2$ are the same or different and are inorganic moieties or conjugated organic moieties selected from the group consisting of aromatic, ethylenically unsaturated aliphatic, acetylenically unsaturated aliphatic, heteroaromatic, aromatic vinylene and heteroaromatic vinylene radicals.

5. The polymer of claim 1 wherein R$^3$ is hydrogen, deuterium, halogen, substituted alkyl, unsubstituted alkyl, alkoxy, cycloalkyl, alkoxyalkyl, phenoxyalkyl or phenylalkyl wherein the hydrogen atoms are optionally replaced by one or more fluorines.

6. The polymer of claim 1 wherein p is 3;k and j are 4; i, m, n, and o are 1, and x and y are the same or different and are 0 or 1.

7. The polymer of claim 1 wherein Z is a moiety of the formula: OR$^4$; and

Q and T are the same or different and are selected from the group consisting of —N(R$^5$)C(O)—, —C(O)N(R$^5$)—, —OC(O)N(R$^5$)—, —N(R$^5$)C(O)O—, —C(O)—, —C(O)O—, —OC(O)—, —O—, —N(R$^5$)CH$_2$CH(OH)CH$_2$O—, —OCH$_2$CH(OH)CH$_2$N(R$^5$)—, —N(R$^5$)C(O)O—, —N(R$^5$)C(O)N(R$^5$)—, —N(R$^5$)CH$_2$CH(OH)CH$_2$O—, —OC(O)O— or

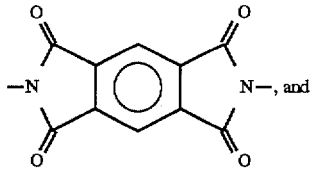

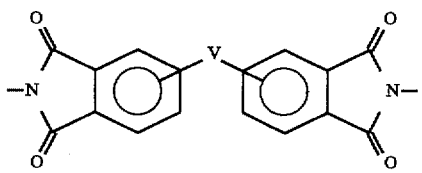

where V is —O—, —OC(O)—, —(O)CO—, —C(O)—, —CR$^5$R$^6$—, —SiR$^5$R$^6$—, —NR$^5$—, —S—, —NR$^5$C(O)—, —SO— or —SO$_2$—;

R$^4$ is substituted alkylene, unsubstituted alkylene, substituted arylene or unsubstituted arylene wherein the hydrogen atoms are optionally replaced by one or more fluorines; and R$^5$ and R$^6$ are the same or different and are hydrogen, deuterium, alkyl or alkyl substituted with one or more fluorines.

8. The polymer of claim 1 wherein R$^1$ and R$^2$ are the same or different, are substituted or unsubstituted, and are azo, phenylene, dimethylenephenylene, phenoxyphenylene, 2,2-diphenylene propane, benzofurylene, benzylidyne, benzylidene, benzoylene, phenylenediazo, propenylene, vinylene, phenylenevinylene, furylene, pyrylene, pyrimidylene, quinolylene, pyranylene, pyranylenevinylene, thienylene, thienylenevinylene, pyridinylene, biphenylene, naphthylene, thienylene vinylene, phenylene vinylene, —(CR$^7$=CR$^7$)$_a$— or —(C≡C)$_b$—, wherein a and b are the same or different and are integers from 1 to about 10 and R$^7$ is the same or different at each occurrence and is hydrogen, alkyl or aryl wherein substituents are alkyl, alkoxy, halogen, deuterium, perfluoroalkyl, alkoxyalkyl, or aryl.

9. The polymer of claim 1 wherein R$^1$ and R$^2$ are the same or different and are —CH=CH—, —C=C—, substituted phenylene, unsubstituted phenylene, substituted furylene, unsubstituted furylene, substituted pyrylene, unsubstituted pyrylene, substituted thienylene, or unsubstituted thienylene.

10. The polymer of claim 1 wherein R$^3$ is hydrogen or deuterium.

11. The polymer of claim 1 wherein A is an electron withdrawing group, at least one of which is substituted at the 7 position when y is 0 or A is substituted to a R$^2$ group which is substituted at the 7 position when y is from 1 to 10;

D is an electron donating group at least one of which is substituted at the 2 position when x is 0 or D is substituted to a R$^1$ which is substituted at the 2 position when x is from 1 to 10;

R¹ and R² are the same or different and are conjugated inorganic, aromatic, ethylenically unsaturated aliphatic, acetylenically unsaturated aliphatic, heteroaromatic, aromatic vinylene or heteroaromatic vinylene radicals;

R³ is hydrogen, deuterium, halogen, substituted alkyl, unsubstituted alkyl, alkoxy, cycloalkyl, alkoxyalkyl, phenoxyalkyl or phenylalkyl wherein substituents are one or more fluorines;

R⁴ is substituted alkylene, unsubstituted alkylene, substituted arylene or unsubstituted arylene wherein the hydrogen atoms are optionally replaced by one or more fluorines; and R⁵ and R⁶ are the same or different and are hydrogen, deuterium, alkyl or alkyl substituted with one or more fluorines.

j and k are 4;
p is 3;
i, m, n, and o are 1;
x and y are the same or different and are 0 or 1;
Z is a moiety of the formula: —QR⁴—;
Q and T are the same or different and are selected from the group consisting of —N(R⁵)C(O)—, —C(O)N(R⁵)—, —OC(O)N(R⁵)—, —N(R⁵)C(O)O—, —C(O)—, —C(O)O—, —OC(O)—, —O—, —N(R⁵)CH₂CH(OH)CH₂O—, —OCH₂CH(OH)CH₂N(R⁵)—, —N(R⁵)C(O)O—, —N(R⁵)C(O)N(R⁵)—, —N(R⁵)CH₂CH(OH)CH₂O—, —OC(O)O—,

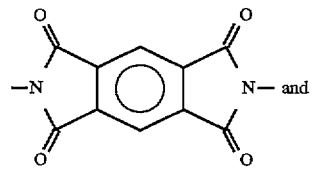

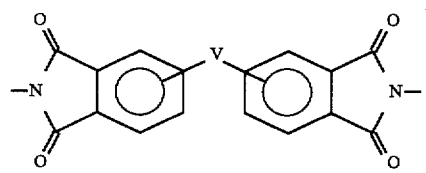

where V is —O—, —OC(O)—, —(O)CO—, —C(O)—, —CR⁵R⁶—, —SiR⁵R⁶—, —NR⁵—, —S—, —NR⁵C(O)—, —SO— or —SO₂—.

12. The polymer of claim 1 wherein A is —NO₂, —CO₂R¹², —SO₂R¹², —CN—, —C(O)R¹²—, —C(CN)=C(CN)₂, —CH=C(CN)₂ or perfluoroalkyl, where R¹² is hydrogen, deuterium, alkyl, or perfluoroalkyl;

D is —NR¹³R¹⁴, —OR¹³, —SR¹³ or

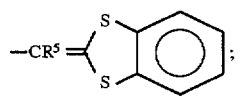

where R¹³ and R¹⁴ are the same or different and are hydrogen, deuterium, alkyl or aryl;

R¹ and R² are the same or different are substituted or unsubstituted and are azo, phenylene, dimethylenephenylene, phenoxyphenylene, 2,2-diphenylene propane, benzofurylene, benzylidyne, benzylidene, benzoylene, phenylenediazo, propenylene, vinylene, phenylenevinylene, furylene, pyrylene, pyrimidylene, quinolylene, pyranylene, pyranylenevinylene, thienylene, thienylenevinylene, pyridinylene, biphenylene, naphthylene, thienylene vinylene, phenylene vinylene, —(CR⁷=CR⁷)ₐ— or —(C≡C)ᵦ—, wherein a and b are the same or different and are integers from 1 to about 10 and R⁷ is the same or different at each occurrence and is hydrogen, alkyl or aryl wherein substituents are alkyl, alkoxy, halogen, deuterium, perfluoroalkyl, alkoxyalkyl, or aryl;

R³ is hydrogen, deuterium, halogen, substituted alkyl, unsubstituted alkyl, alkoxy, cycloalkyl, alkoxyalkyl, phenoxyalkyl or phenylalkyl wherein the hydrogen atoms are optionally replaced by one or more fluorines;

R⁴ is substituted alkylene, unsubstituted alkylene, substituted arylene, or unsubstituted arylene wherein substituents are one or more fluorines;

R⁵ and R⁶ are the same or different and are hydrogen, deuterium, alkyl or alkyl substituted with one or more fluorines;

p is 3;
j and k are 4;
i, m, n, and o are 1;
x and y are the same or different and are 0 or 1;
Z is a moiety of the formula: —Q-R⁴—;
Q and T are the same or different and are selected from the group consisting of —N(R⁵)C(O)—, —C(O)N(R⁵)—, —OC(O)N(R⁵)—, —N(R⁵)C(O)O—, —C(O)—, —C(O)O—, —OC(O)—, —O—, —N(R⁵)CH₂CH(OH)CH₂O—, —OCH₂CH(OH)CH₂N(R⁵)—, —N(R⁵)C(O)N(R⁵)—, —OC(O)O—,

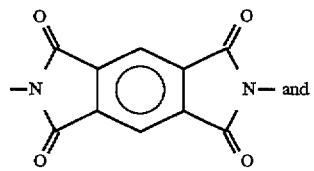

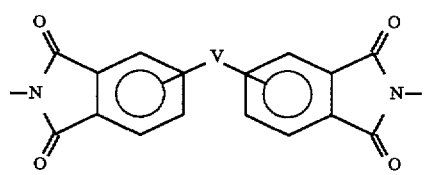

where V is —O—, —OC(O)—, —(O)CO—, —C(O)—, —CR⁵R⁶—, —SiR⁵R⁶—, —NR⁵—, —S—, —NR⁵C(O)—, —SO— or —SO₂—.

13. The polymer of claim 1 wherein A is NO₂, —SO₂R¹²—, —CN—, —C(CN=C(CN)₂ or —CH=C(CN)₂ where R¹² is alkyl or perfluoroalkyl;

D is —NR¹³R¹⁴, —OR¹³, or

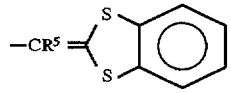

where R¹³ and R¹⁴ are the same or different and are hydrogen, deuterium, alkyl or aryl;

R¹ and R² are the same or different and are —CH=CH—, —C=C— substituted phenylene, unsubstituted phenylene, substituted furylene, unsubstituted furylene, substituted pyrylene, unsubstituted pyrylene, substituted thienylene, or unsubstituted thienylene;

R³ is hydrogen or deuterium;

R⁴ is substituted or unsubstituted alkylene or arylene wherein substituents are one or more fluorines;

R[5] and R[6] are the same or different and are hydrogen, deuterium, alkyl or alkyl substituted with one or more fluorines;

p is 3;

i, m, n and o are 1;

j and k are 4;

x and y are the same or different and are 0 or 1;

T and Z are substituted at the 4' and 4" positions;

Z is a moiety of the formula: —Q—R[4]—;

Q and T are the same or different and are selected from the group consisting of —N(R[5])C(O)—, —C(O)N(R[5])—, —OC(O)N(R[5])—, —N(R[5])C(O)O—, —C(O)O—, —O—, —OC(O)—, —N(R[5])CH$_2$CH(OH)CH$_2$O—, —OCH$_2$CH(OH)CH$_2$N(R[5])—, —N(R[5])C(O)N(R[5])—, —OC(O)O—,

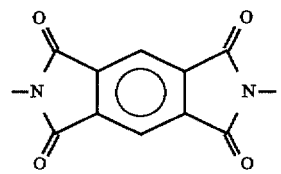

and

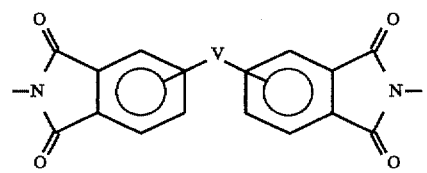

where V is —O—, —C(O)—, —CH$_2$—, —C(CH$_3$)$_2$—, —C(CF$_3$)$_2$—, or —SO$_2$—.

14. The polymer of claim 1 having recurring monomeric units of the formula:

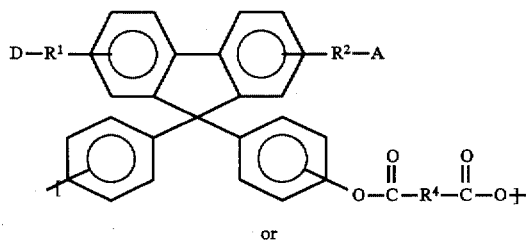

or

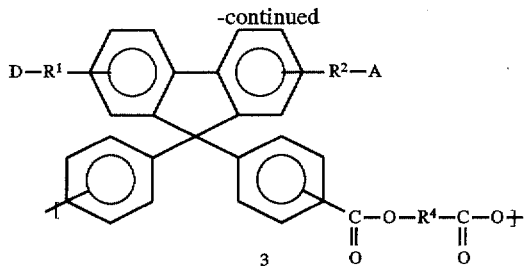

wherein:

A is an electron withdrawing substituent selected from the group consisting of —NO$_2$, CO$_2$R[12], SO$_2$R[12], —CN, —C(O)R[12], —C(CN)=C(CN)$_2$, —CH=C(CN)$_2$ and perfluoroalkyl, where R[12] is hydrogen, deuterium, alkyl or perfluoroalkyl;

D is an electron donating substituent selected from the group consisting of —NR[13]R[14], —OR[13] and —SR[13], where R[13] and R[14] are the same or different and are hydrogen, deuterium, alkyl or aryl; and R[1] and R[2] are the same or different and are divalent conjugated organic or inorganic moieties; and R[4] is a divalent hydrocarbon radical.

15. The polymer of claim 1 having recurring monomeric units of the formula:

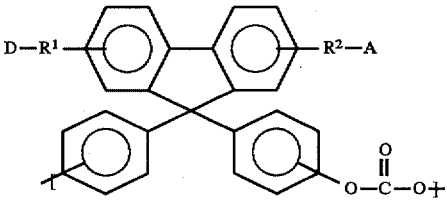

wherein:

A is an electron withdrawing substituent selected from the group consisting of —NO$_2$, CO$_2$R[12], —SO$_2$R[12], —CN, —C(O)R[12], —C(CN)=C(CN)$_2$—, —CH=C(CN)$_2$ and perfluoroalkyl, where R[12] is hydrogen, deuterium, alkyl or perfluoroalkyl;

D is an electron donating substituent selected from the group consisting of —NR[13]R[14], —OR[13] and —SR[13], where R[13] and R[14] are the same or different and are hydrogen, deuterium, alkyl or aryl; and R[1] is a divalent conjugated organic or inorganic moiety.

16. The polymer of claim 1 having recurring monomeric units of the formula:

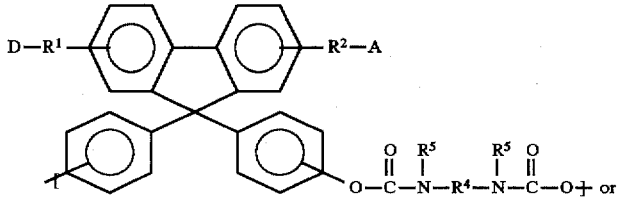

-continued

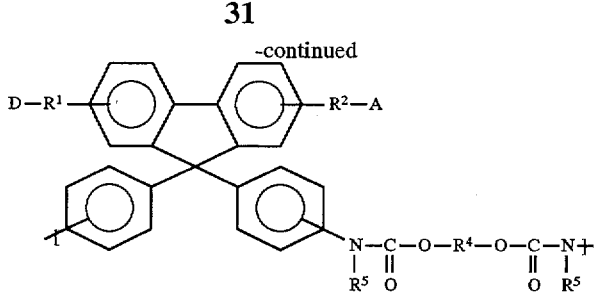

wherein:

A is an electron withdrawing substituent selected from the group consisting of —NO₂, $CO_2R^{12}$, —$SO_2R^{12}$, —CN, —C(O)$R^{12}$, —C(CN)=C(CN)₂—, CH=C(CN)₂ and perfluoroalkyl, where $R^{12}$ is hydrogen, deuterium, alkyl or perfluoroalkyl;

D is an electron donating substituent selected from the group consisting of —$NR^{13}R^{14}$, —$OR^{13}$ and —$SR^{13}$, where $R^{13}$ and $R^{14}$ are the same or different and are hydrogen, deuterium, alkyl or aryl; and $R^1$ and $R^2$ are the same or different and are divalent conjugated organic or inorganic moieties; $R^4$ is a divalent hydrocarbon radical; and $R^5$ is a monovalent moiety.

17. The polymer of claim 1 having recurring monomeric units of the formula:

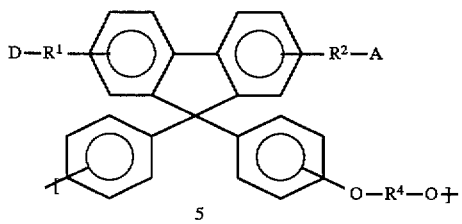

wherein:

A is an electron withdrawing substituent selected from the group consisting of —NO₂, $CO_2R^{12}$, —$SO_2R^{12}$, —CN, —C(O)$R^{12}$, —C(CN)=C(CN)₂, —CH=C(CN)₂ and perfluoroalkyl, where $R^{12}$ is hydrogen, deuterium, alkyl or perfluoroalkyl;

D is an electron donating substituent selected from The group consisting of —$NR^{13}R^{14}$, —$OR^{13}$ and —$SR^{13}$, where $R^{13}$ and $R^{14}$ are the same or different and are hydrogen, deuterium, alkyl or aryl; and $R^1$ and $R^2$ are the same or different and are divalent conjugated organic or inorganic moieties; and $R^4$ is a divalent hydrocarbon radical.

18. The polymer of claim 1 having recurring monomeric units of the formula:

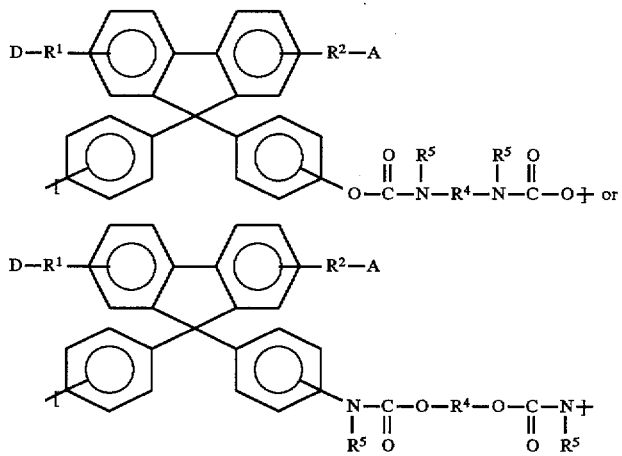

wherein:

A is an electron withdrawing substituent selected from the group consisting of —NO₂, $CO_2R^{12}$, —$SO_2R^{12}$, —CN, —C(O)$R^{12}$, —C(CN)=C(CN)=C(CN)₂, CH=C(CN)₂ and perfluoroalkyl, where $R_{12}$ is hydrogen, deuterium, alkyl or perfluoroalkyl;

D is an electron donating substituent selected from the group consisting of —$NR^{13}R^{14}$, —$OR^{13}$ and —$SR^{13}$, where $R^{13}$ and $R^{14}$ are the same or different and are hydrogen, deuterium, alkyl or aryl; and $R^1$ and $R^2$ are the same or different and are divalent conjugated organic or inorganic moieties; $R^4$ is a divalent hydrocarbon radical; and $R^5$ is a monovalent moiety.

19. The polymer of claim 1 having recurring monomeric units of the formula:

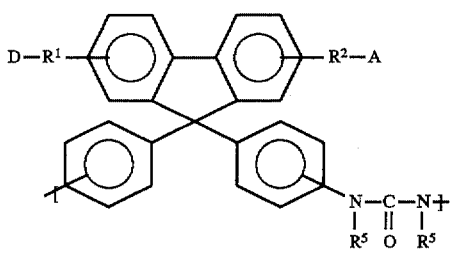

wherein;

A is an electron withdrawing substituent selected from the group consisting of —$NO_2$, $CO_2R^{12}$, —$SO_2R^{12}$, —CN, —C(O)$R^{12}$, —C(CN)=C(CN)$_2$, —CH=C(CN)$_2$ and perfluoroalkyl, where $R^{12}$ is hydrogen, deuterium, alkyl or perfluoroalkyl;

D is an electron donating substituent selected from the group consisting of —$NR^{13}R^{14}$, —$OR^{13}$ and —$SR^{13}$, where $R^{13}$ and $R^{14}$ are the same or different and are hydrogen, deuterium, alkyl or aryl; and $R^1$ and $R^2$ are the same or different and are divalent conjugated organic or inorganic moieties; and $R^6$ is a monovalent moiety.

20. The polymer of claim 1 having recurring monomeric units of the formula:

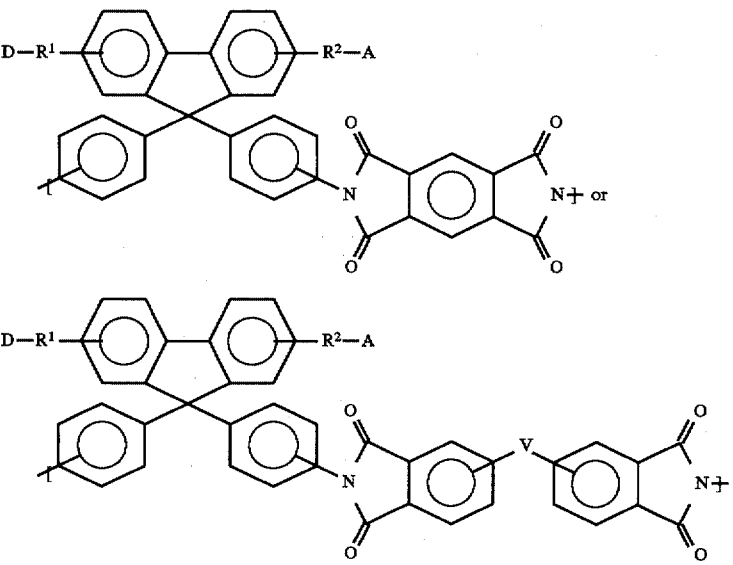

wherein:

A is an electron withdrawing substituent selected from the group consisting of —$NO_2$, $CO_2R^{12}$, —$SO_2R^{12}$, —CN, —C(O)$R^{12}$, —C(CN)=C(CN)$_2$, —CH=C(CN)$_2$ and perfluoroalkyl, where $R^{12}$ is hydrogen, deuterium, alkyl or perfluoroalkyl;

D is an electron donating substituent selected from the group consisting of —$NR^{13}R^{14}$, —$OR^{13}$ and —$SR^{13}$, where R and $R^4$ are the same or different and are hydrogen, deuterium, alkyl or aryl; $R^1$ and $R^2$ are the same or different and are divalent conjugated organic or inorganic moieties; and V is —O—, —OC(O)—, —(O)CO—, —C(O)—, —$CR^5R^6$—, —$SiR^5R^6$—, —$NR^5$—, —S—, —$NR^5$C(O)—, —SO— or —$SO_2$—, $R^5$ and $R^6$ are the same or different and are hydrogen, deuterium alkyl or alkyl substituted with one or more fluorines.

21. The polymer of claim 1 having recurring monomeric units of the formula:

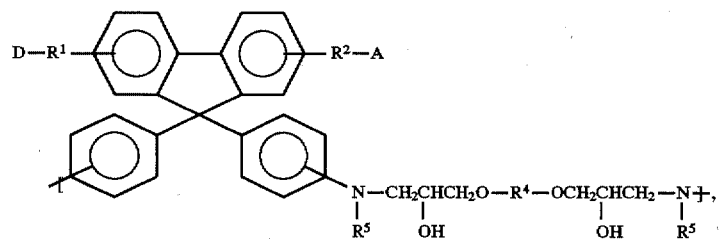

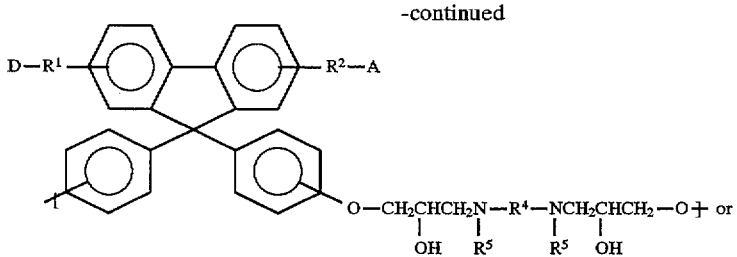

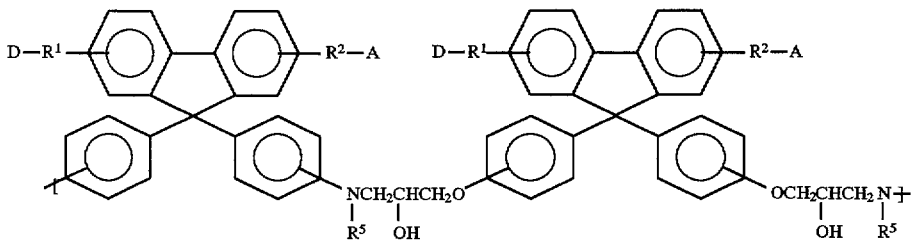

wherein:

A is an electron withdrawing substituent selected from the group consisting of —NO$_2$, CO$_2$R$^{12}$, —SO$_2$R$^{12}$, —CN, —C(O)R$^{12}$, —C(CN)=C(CN)$_2$, —CH=C(CN)$_2$ and perfluoroalkyl, where R$^{12}$ is hydrogen, deuterium, alkyl or perfluoroalkyl;

D is an electron donating substituent selected from the group consisting of —NR$^{13}$R$^{14}$, —OR$^{13}$ and —SR$^{13}$, where R$^{13}$ and R$^{14}$ are the same or different and are hydrogen, deuterium, alkyl or aryl; and R$^1$ and R$^2$ are the same or different and are divalent conjugated organic or inorganic moieties; R$^4$ is a divalent hydrocarbon radical; and R$^5$ is a monovalent moiety.

22. A polyester comprising recurring units of the formula:

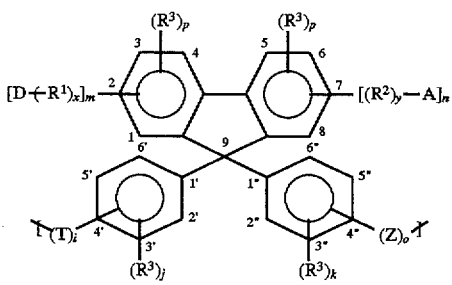

wherein:

A is an electron withdrawing substituent selected from the group consisting of —NO$_2$, —CO$_2$R$^{12}$, —SO$_2$R$^{12}$, —CN, —C(O)R$^{12}$, —C(CN)=C(CN)$_2$, —CH=C(CN)$_2$ and perfluoroalkyl, where R$^{12}$ hydrogen, deuterium, alkyl, or perfluoroalkyl;

D is an electron donating substituent selected from the group consisting of —NR$^{13}$R$^{14}$, —OR$^{13}$, —SR$^{13}$ and

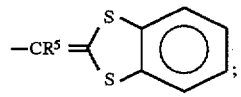

wherein R$^{13}$ and R$^{14}$ are the same or different and are hydrogen, deuterium, alkyl or aryl;

R$^1$ and R$^2$ are the same or different and are an inorganic or divalent conjugated organic moiety;

m, n and p are the same or different at each occurrence and are integers from 1 to 3 wherein the sum of p and n, as well as the sum of p and m, is equal to 4;

k and o are the same or different at each occurrence and are integers from 1 to 4 wherein the sum of k and o is equal to 5;

i and j are the same or different and are 0 or an integer from 1 to 5 wherein the sum of i and j is equal to 5;

R$^3$ is the same or different at each occurrence and is a monovalent moiety;

x and y are the same or different and are 0 or an integer from 1 to about 10;

Z is the same or different at each occurrence and is a moiety of the formula:

—OR$^4$— or —Q—;

Q and T are the same or different and are selected from the group consisting of divalent moieties of the formula: —OC(O)—, and —C(O)O—, and R$^4$ is a divalent hydrocarbon radical.

* * * * *